(12) United States Patent
Forbes et al.

(10) Patent No.: US 8,738,543 B2
(45) Date of Patent: May 27, 2014

(54) BUSINESS INTELLIGENCE BASED SOCIAL NETWORK WITH VIRTUAL DATA-VISUALIZATION CARDS

(75) Inventors: Kyle Forbes, Sunnyvale, CA (US); Phong Dang, San Jose, CA (US); Egor Gruz, San Jose, CA (US)

(73) Assignee: Ebay Inc., San Jose, CA (US)

( * ) Notice: Subject to any disclaimer, the term of this patent is extended or adjusted under 35 U.S.C. 154(b) by 321 days.

(21) Appl. No.: 13/165,468

(22) Filed: Jun. 21, 2011

(65) Prior Publication Data

US 2012/0330853 A1 Dec. 27, 2012

(51) Int. Cl.
G06Q 99/00 (2006.01)
G06Q 30/00 (2012.01)
G06Q 10/00 (2012.01)

(52) U.S. Cl.
USPC ............... 705/319; 705/7.39; 705/347

(58) Field of Classification Search
USPC .......................... 705/319, 347, 7.39
See application file for complete search history.

(56) References Cited

U.S. PATENT DOCUMENTS

| | | | |
|---|---|---|---|
| 7,653,582 B2 | 1/2010 | Costache et al. | |
| 7,949,953 B2 | 5/2011 | Bhatt et al. | |
| 2004/0168115 A1 | 8/2004 | Bauernschmidt et al. | |
| 2007/0022000 A1* | 1/2007 | Bodart et al. | 705/10 |
| 2007/0203720 A1 | 8/2007 | Singh et al. | |
| 2008/0209329 A1* | 8/2008 | DeFranco et al. | 715/733 |
| 2009/0271289 A1 | 10/2009 | Klinger et al. | |
| 2010/0211895 A1* | 8/2010 | Mistry et al. | 715/764 |
| 2012/0035992 A1* | 2/2012 | Tanaka et al. | 705/14.4 |
| 2012/0089644 A1* | 4/2012 | Doggett et al. | 707/780 |
| 2013/0262207 A1* | 10/2013 | Miskell | 705/14.16 |

OTHER PUBLICATIONS

PCT International Search Report, Application No. PCT/US2012/43597 mailed Sep. 10, 2012.
Ereteo. "Semantic Social Network Analysis", dated Apr. 11, 2011, retrieved from the Internet at URL:http://hal.inria.fr/docs/00/58/66/77/PDF/PhD_thesis_Semantic_Social_Network_Analysis_Guillaume_ERETEO.pdf, entire document, especially Seciton 3.1, $1^{st}$ paragraph; Section 3.1.4, $1^{st}$ paragraph; Section 3.2.2, $5^{th}$ paragraph, Section 3.2.3.3, $3^{rd}$ paragraph; Section 3.3.1.2, $6^{th}$ paragraph.
Kosala et al. "Web Mining Research: A Survey", dated Nov. 22, 2000, retrieved from the Internet at URL:http://arxiv.org/pdf/cs.LG/0011033.pdf, entire document.

* cited by examiner

*Primary Examiner* — Amanda Kirlin
(74) *Attorney, Agent, or Firm* — Haynes and Boone, LLP

(57) ABSTRACT

A method for sharing business intelligence information includes creating a plurality of data visualization cards from business intelligence data in response to create requests from a plurality of user accounts. Each data visualization card is associated with the user account that requested its creation. Data visualization cards are also associated with user accounts that did not request their creation in response to collect requests from those user accounts. A social network is created amongst the user accounts using the data visualization cards such that user accounts associated with data visualization cards created from common business intelligence data are linked. A first data visualization card that was created in response to a create request from a first user account may then be provided to a second user account in response to determining that the first user account and the second user account are linked in the social network.

20 Claims, 16 Drawing Sheets

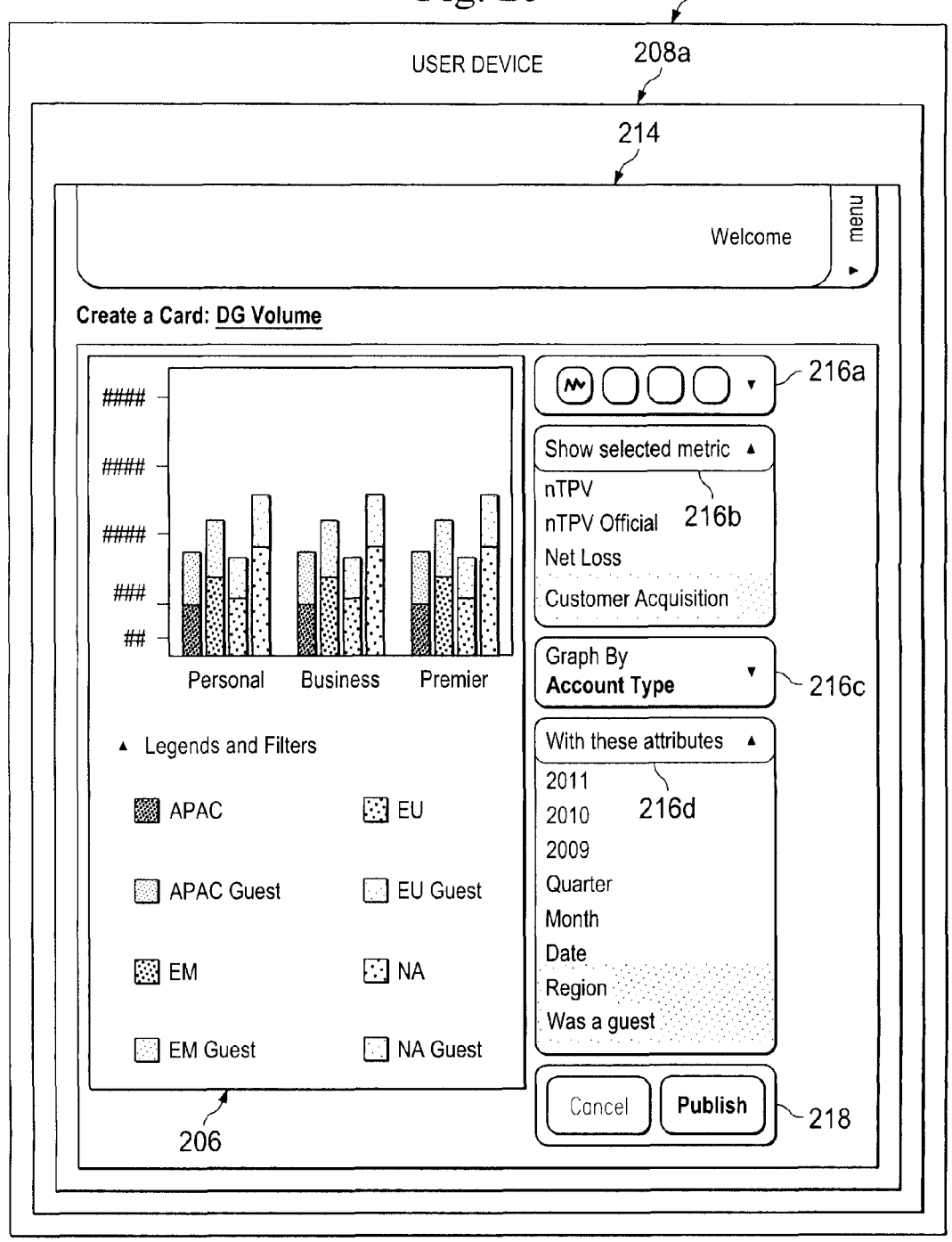

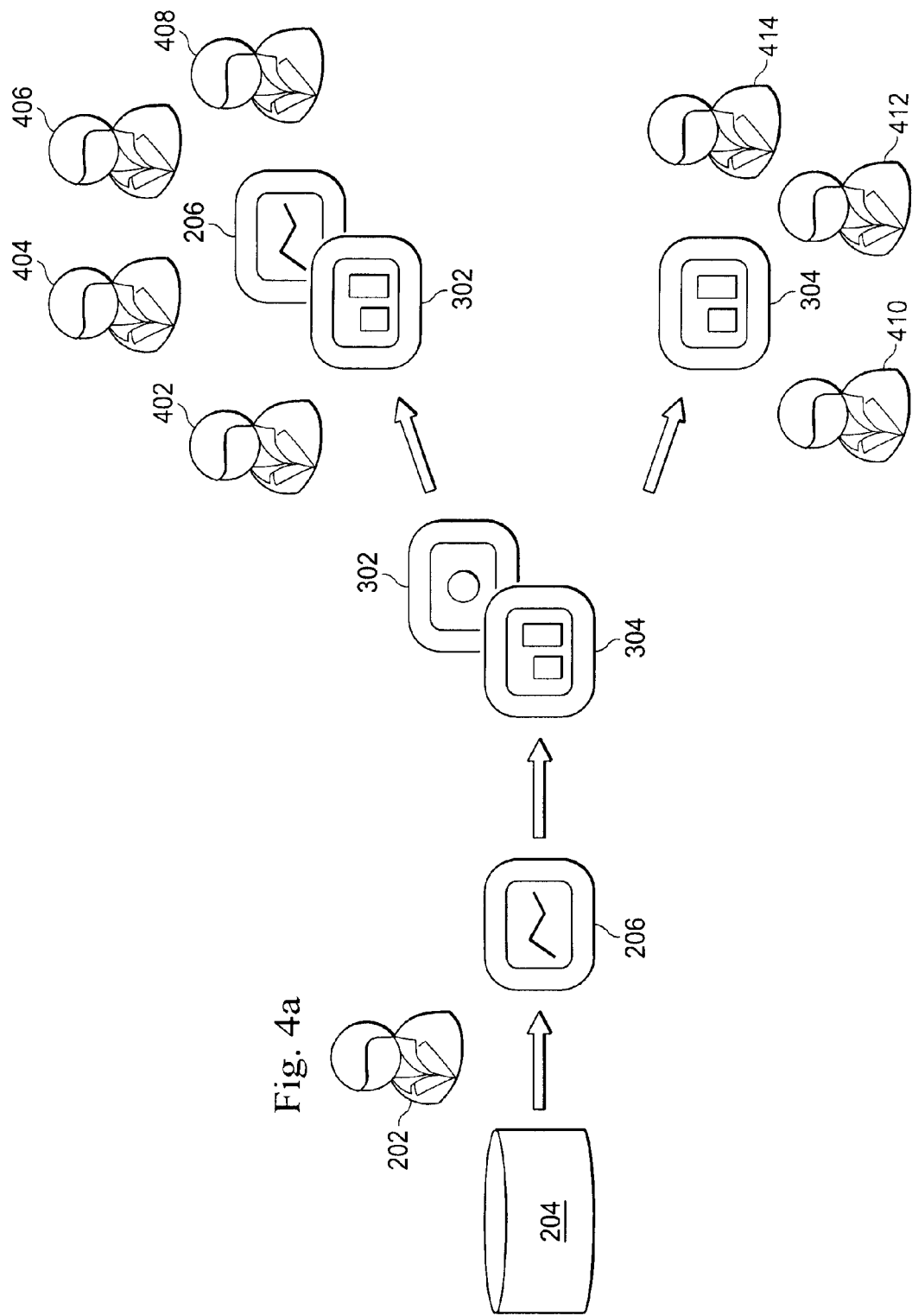

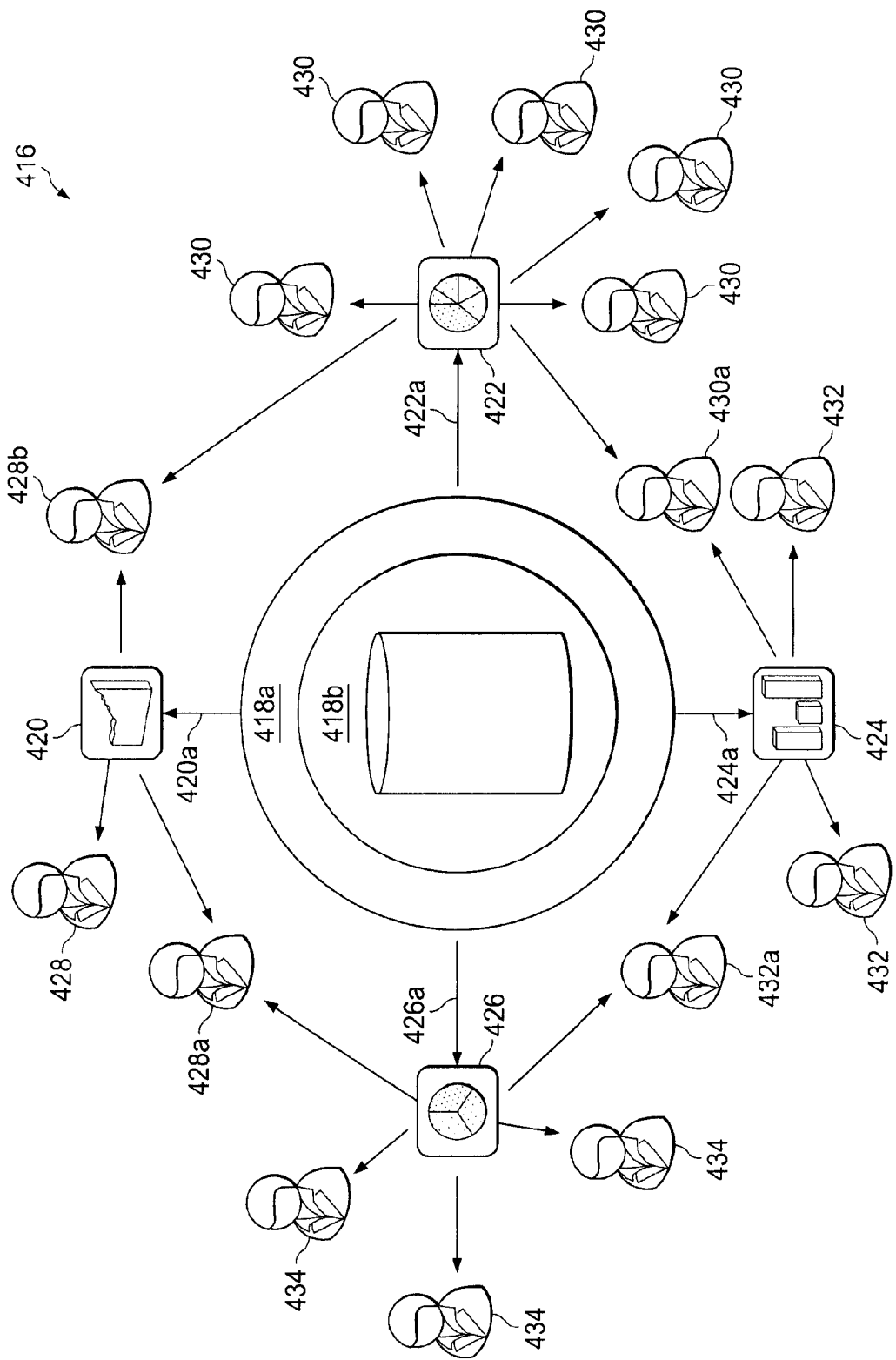

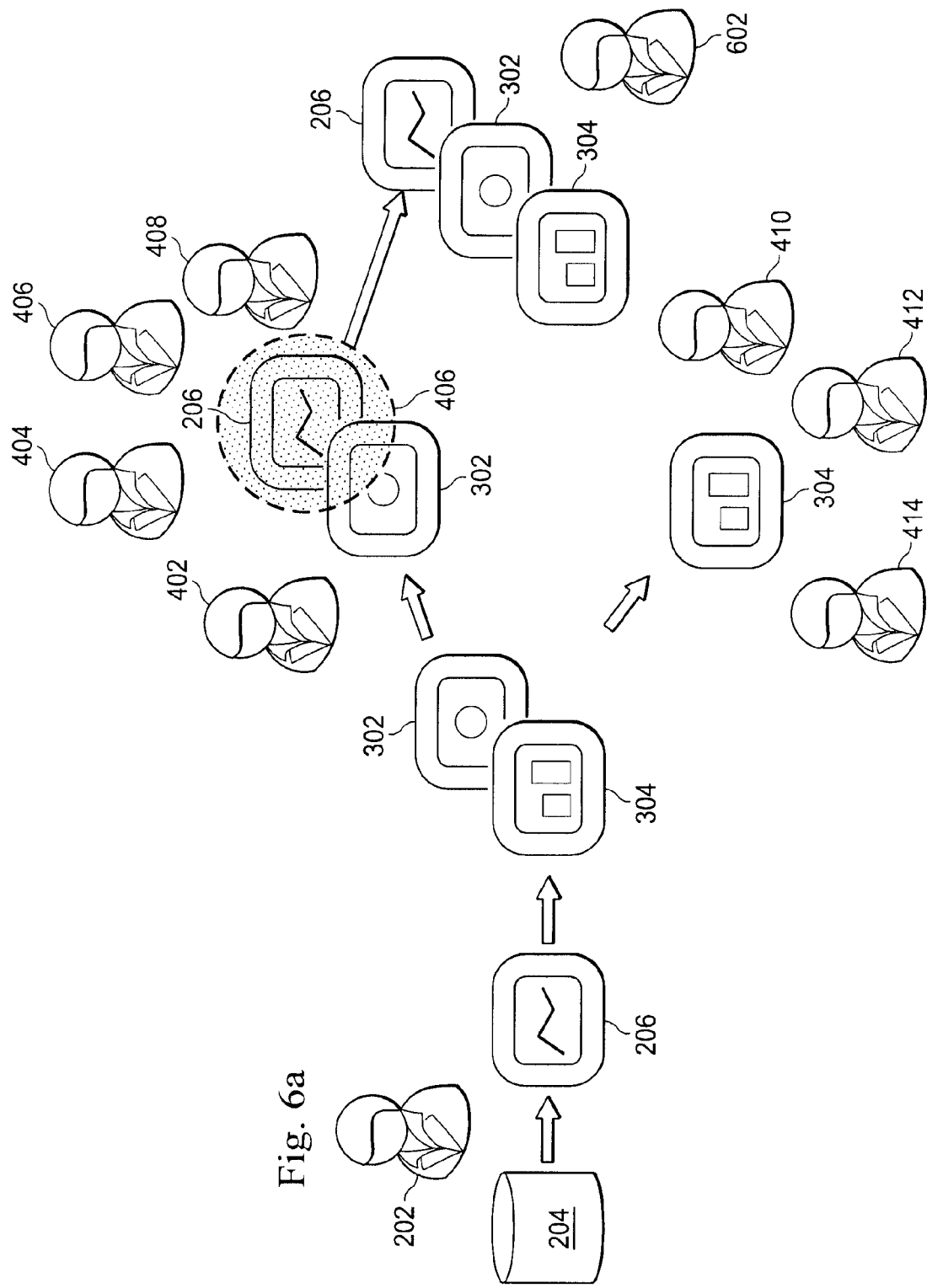

BUSINESS INTELLIGENCE BASED SOCIAL NETWORK WITH VIRTUAL DATA-VISUALIZATION CARDS

BACKGROUND

1. Field of the Invention

The present invention generally relates to social network systems and more particularly to using business intelligence information to build a social network through the creation and collection of virtual data visualization cards.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering user information such as user financial information (e.g., credit card information.) Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Payment service providers are just one example of many businesses that generate business intelligence information, which may be viewed, in one way, as information generated from the operations of a business that may be analyzed to determine how that business is performing. Conventional business intelligence systems such as, for example, those provided by Microstrategy, Essbase, and a variety of other business intelligence system providers known in the art, collect business intelligence data generated by businesses and allow those businesses to use that data to analyze business performance.

However, while such conventional business intelligence systems allow a user to analyze specific business intelligence data, they provide no systems to distribute the vast amount of business intelligence information contained in the system. Without such a system, much of the business intelligence information included in conventional business intelligence systems may never be utilized by many of the users of the business intelligence system.

Thus, there is a need for an improved business intelligence information distribution system.

SUMMARY

According to one embodiment, a method for distributing business intelligence information includes creating a plurality of data visualization cards from business intelligence data and associating those data visualization cards with user accounts. Users may create or collect data "visualization cards" in their users accounts that include business intelligence data that they are interested in. A social network is then created amongst the user accounts using the data visualization cards such that user accounts associated with data visualization cards created from common business intelligence data are linked.

As a result, a data visualization card that was created in response to a create request from a first user account may then be provided to a second user account in response to determining that the first user account and the second user account are linked in the social network. Thus, business intelligence information is distributed to a plurality of users using a social network that links the users based on the information that they are interested in (e.g., the data visualization cards they've created or collected).

These and other features and advantages of the present disclosure will be more readily apparent from the detailed description of the embodiments set forth below taken in conjunction with the accompanying figures.

BRIEF DESCRIPTION OF THE FIGURES

FIG. 2c is a screen shot illustrating an embodiment of a data visualization card being created;

FIG. 4a is a schematic view illustrating an embodiment of a plurality of user accounts collecting data visualization cards;

FIG. 4b is a schematic view illustrating an embodiment of a plurality of user accounts being provided data visualization cards;

FIG. 6a is a schematic view illustrating an embodiment of a data visualization card being suggested or provided to a user account based on the social network of FIG. 5b;

Figure 1:
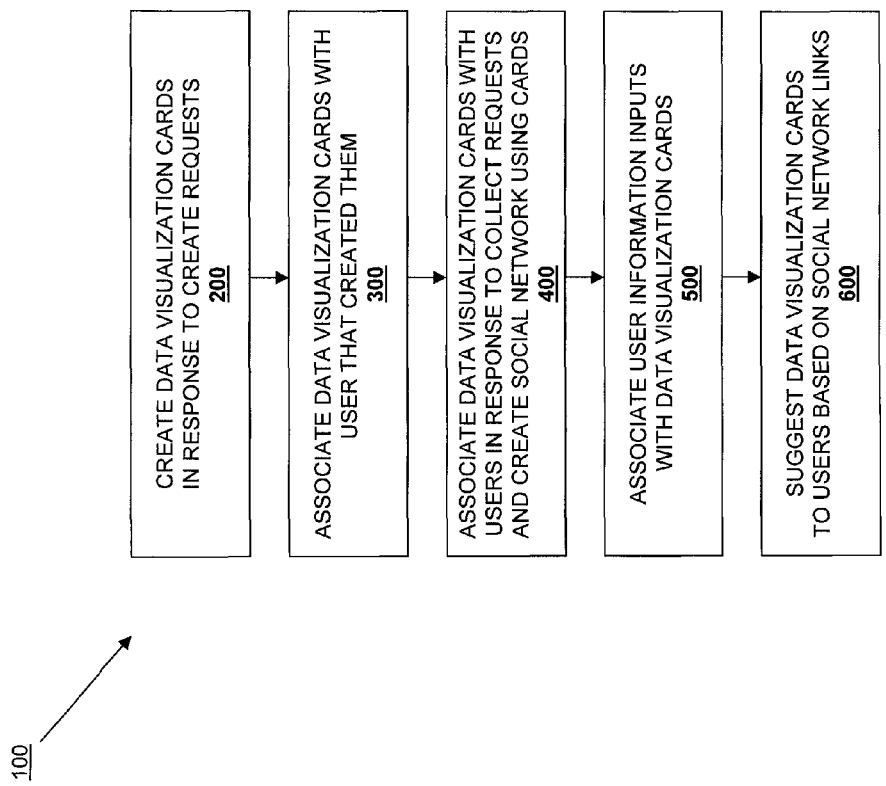
FIG. 1 is a flow chart illustrating an embodiment of method for distributing business intelligence information.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In one embodiment, the present disclosure provides a system and method for distributing business intelligence information. A social network system is built based on business intelligence information that is viewed and collected by users of the system through data visualization cards. The users create and collect the data visualization cards, which are created using business intelligence data, and the business intelligence data is used to link users in the social network system by linking users that create and collect cards that use common business intelligence data. Once the users have been linked using the data visualization cards, the system may use those links to suggest data visualization cards to users who did not create them and have not collected them. For example, a first user may be linked to plurality of other users based on the first user being associated with data visualization cards that use business intelligence data which is also used by data visualization cards created or collected by the other users. In such an example, data visualization cards (which the first user has not created or collected) may be suggested to the first user in response to determining that the other users have created or collected those data visualization cards or determining that those data visualization cards were created using business intelligence data that is used in a plurality of data visualization cards the first users has created or collected. Thus, business intelligence information is distributed through the social network system to users that would otherwise not receive and/or use that business intelligence information.

Referring now to FIG. 1, a method 100 for distributing business intelligence information is illustrated. The method 100 may be performed with a business, across businesses, and/or in a variety of other situations known in the art. For example, one or more businesses may generate business intelligence information (e.g., in the form of business intelligence data) in the course of the operation of the business. The business intelligence data may include data about business sales, customers, products, and/or a variety of other business intelligence data known in the art. Specific examples of business intelligence data may include the distribution of new customer signups by business unit and by region over a weekly period for the last quarter, the percentage of new customer accounts that went on to actually purchase at least one product, the volume of sales in the current quarter versus the same quarter last year, the average number and size of purchases for the average customer, the average number of times a customer visits a site or a store, and/or a variety of other business intelligence data known in the art. That business intelligence data may be collected and stored in one or more databases. The business intelligence system of the present disclosure may collect and store the business intelligence data, or may be coupled to other systems and/or databases used to collect and store the business intelligence data. In an embodiment, the business intelligence system may access conventional business intelligence systems and/or databases to retrieve and store the business intelligence data in the business intelligence system. A plurality of users are connected to the business intelligence system through a network via user devices. Each of the plurality of users includes a user account in the business intelligence system that allows that user to access and use the business intelligence system according to the method 100.

Figure 2A:
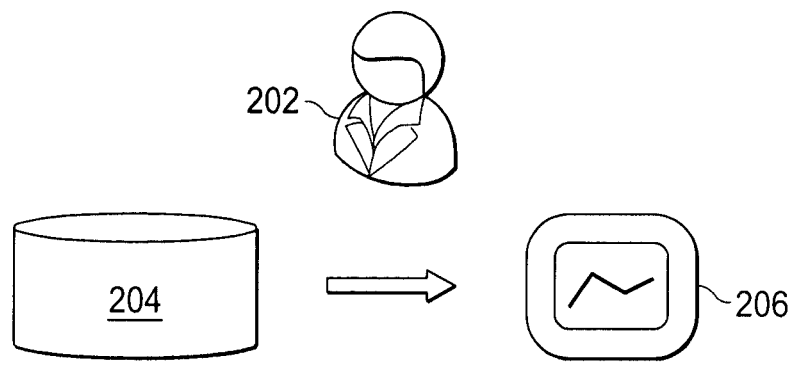
FIG. 2a is a schematic view illustrating an embodiment of a user account creating an data visualization card.
Figure 2B:
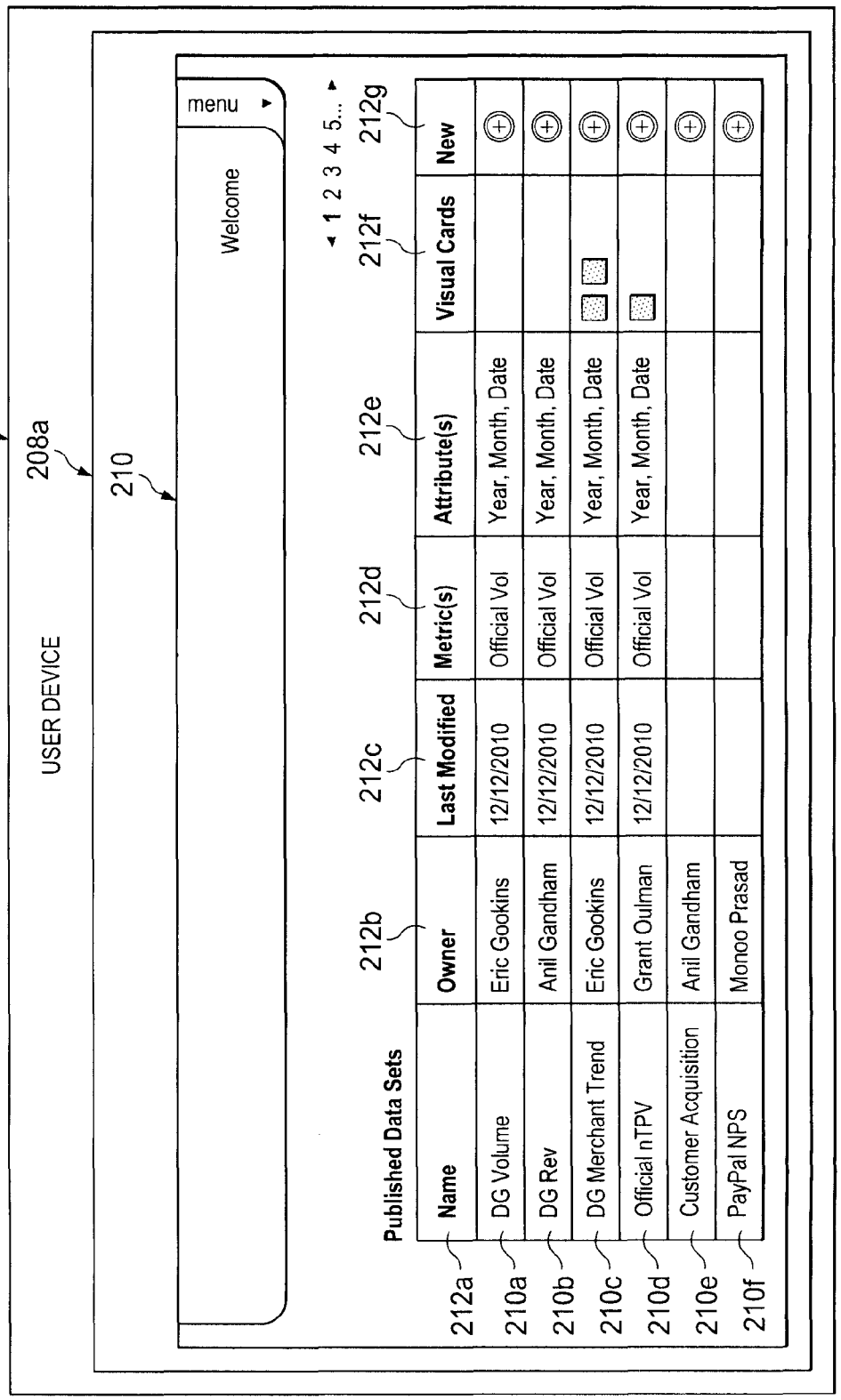
FIG. 2b is a screen shot illustrating an embodiment of a plurality of data sets being provided to a user to create a data visualization card.

Referring now to FIGS. 1, 2a, 2b, and 2c, the method 100 begins at block 200 where a plurality of data visualization cards are created in response to create requests. FIG. 2a illustrates a user 202 that sends a create request to the business intelligence system (e.g., over a network using a user account on a user device) that causes the business intelligence system to access a database 204 and create a data visualization card 206. For example, the user 202 may use a user device 208 that includes a user device display 208a, illustrated in FIGS. 2b and 2c, and that is connected to the business intelligence system through a network. The user 202 may be presented with a business intelligence database screen 210 on the user device display 208a that includes a plurality of published data sets 210a, 210b, 210c, 210d, 210e, and 210f, illustrated in FIG. 2b. In an embodiment, each of the plurality of published data sets include business intelligence data that was generated by the business or businesses associated with the business intelligence system. The plurality of published data sets may have been collected and stored in a database by the business intelligence system, retrieved from a database created by other business intelligence systems (e.g., over a network), and/or acquired using a variety of other techniques known in the art. In an embodiment, the published data sets may have been uploaded to the business intelligence system by one of the users of the business intelligence system. For example, data reports (e.g., spreadsheets and/or other data holding structure known in the art) may be published to software by one or more business intelligence data providers (e.g., Microstrategy, Inc.—http://www.microstrategy.com/; Cognos Inc., http://www-01.ibm.com/software/data/cognos/; and/or a variety of other business intelligence providers known in the art). The business intelligence system may periodically speak with that software to retrieve the data reports and/or update previously retrieved data reports. The data from the retrieved database reports may then be transferred to the business intelligence system to be made available for users to create data visualization cards, as discussed in further detail below.

In the illustrated embodiment, each published data set may include a database name under a data set name section 212a, an owner name (e.g., the creator of the published data set) under an owner name section 212b, a last modification date under a last modification date section 212c, an associated metric under an associated metric section 212d, an attribute (e.g., the date range included in the data set) under an attributes section 212e, one or more associated data visualization cards (e.g., data visualization cards that have been created using that data set, discussed below) under a data visualization card list section 212f, and a button under a create data visualization card button section 212g.

The user 202 may select the button in the create data visualization card button section 212g of a particular published data set in order to create a data visualization card from that published data set. In response to selecting a button in the create data visualization card button section 212g of a particular published data set, the business intelligence system presents the user 202 with a data visualization card creation screen 214 on the user device display 208a of the user device 208, illustrated in FIG. 2c. The data visualization card creation screen 214 includes a plurality of data visualization card creation tools such as, for example, a graphic type tool 216a, a metric selection tool 216b, a graphing type tool 216c, and attribute selection tool 216d. The data visualization card creation screen 214 also includes a publish button 218. While a plurality of data visualization card creation tools are illustrated and described, they are meant to be merely exemplary, and one of skill in the art will recognize that a variety of other data visualization card creation tools may be provided to create data visualization cards from data sets that will fall within the scope of the present disclosure.

The user 202 may create the data visualization card 206 using the data visualization card creation tools, illustrated in FIG. 2c. In response to the user 202 using the data visualization card creation tools, a create request is sent from the user device 208 through the network to the business intelligence system that causes the business intelligence system to retrieve business intelligence data from a database (e.g., business intelligence data included in the published data set selected using the button in the create data visualization card button section 212g of that published data set, as described above with reference to the business intelligence database screen 210 of FIG. 2b) and use that business intelligence data to create the data visualization card 206 according to the create request. When the data visualization card 206 has been created to the satisfaction of the user 202, the user 202 may select the publish button 218 to publish the data visualization card 206 to the business intelligence system such that other users may view the data visualization card 206.

For example, the user 202 may use the graphic type tool 216a to select a graphic type for the data visualization card 206. A graphic type may include a line graph graphic type, a bar chart graphic type, a pictograph graphic type, a pie chart graphic type, a cosmograph graphic type, an organizational chart graphic type, a flow chart graphic type, a histogram graphic type, a scatterplot graphic type, a box plot graphic type, a map graphic type, and/or a variety of other graphic types know in the art. The user 202 may also use the metric selection tool 216b to select a metric or other measure that helps quantitatively assess the business intelligence data in the published data set that the user 202 is interested in. The user 202 may also use the graphing type tool 216c to select a metric type to include in the data visualization card 218. The user 202 may also use the attribute selection tool 216d to select an metric attribute to include in the data visualization card.

In response to the selections made by the user 202 using the data visualization card creation tools, one or more create requests are sent to the business intelligence system that cause the business intelligence system to retrieve business intelligence data from a database and use that business intelligence data to create the data visualization card 206. For example, FIG. 2c, illustrates the data visualization card 206 that has been created by the user 202 selecting a bar chart graphic type, a customer acquisition metric, an account metric type, and with region and guest attributes. In an embodiment, the types of business intelligence data used to create the data visualization card may be referred to as the business intelligence data parameters of that data visualization card, and those business intelligence data parameters are associated with the data visualization card such that any updates to the business intelligence data in a database may be retrieved and displayed on the data visualization card using the business intelligence data parameters. Thus, data visualization cards are dynamic in that, once created by defining the business intelligence data parameters, the data visualization card is operable to display the most recent business intelligence data that is associated with those business intelligence data parameters. As such, data visualization cards can be defined as a graphical representation of a defined set of information represented on a virtual collectable card that may be shared, but may also include any set of instructions, stored on a non-transitory, computer-readable medium, that when executed by a processor, cause the processor to retrieve a defined set of information, transform that defined set of information into a graphical representation of that information, and provide that graphical representation on a virtual card that may be shared amongst users.

In another embodiment, a data visualization card is a collectable and tradable virtual object that contains content that includes information provided from the business intelligence system and from users (e.g., user provided insights and/or comments on the information). Functionally, a data visualization card may be thought of as akin to subscribing to a newspaper. By collecting a data visualization card, a user is subscribing to an information feed that includes data from both the business intelligence systems and from the actions of other users associated, both directly and indirectly, with that data visualization card. The foundation of the data visualization card is a data visualization whereby a set of numeric data is visually represented in any manner that one would want to visually represent data in order to convey a visual story about that data. In addition to the visualization, a data visualization card will display one or more pieces of metadata such as, for example, the user that created the data visualization card, the time of creation of the data visualization card, definitions of the data being displayed by the data visualization card, the most recent time the data in the data visualization card was refreshed, and/or a variety of other metadata known in the art. Finally, a data visualization card may also contain references to other information (comments, insights, other suggested data visualization cards) of value to anyone interested in the data being portrayed in that data visualization card.

Figure 3A:
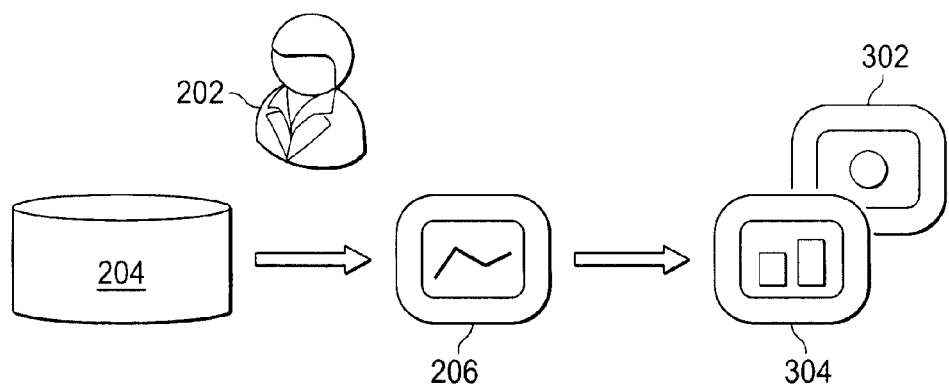
FIG. 3a is a schematic view illustrating an embodiment of a user account being associated with a plurality of data visualization cards.
Figure 3B:
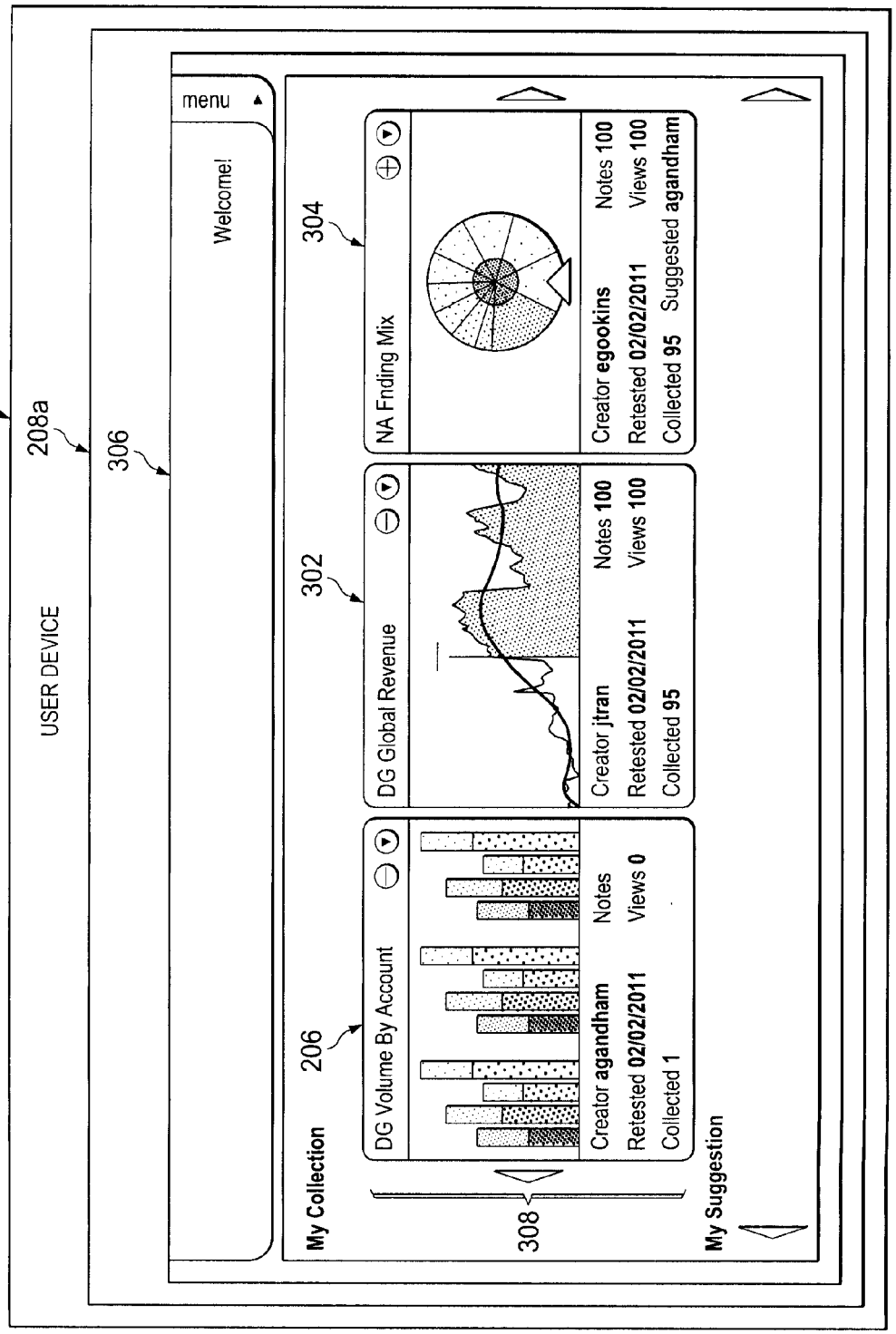
FIG. 3b is a screen shot illustrating an embodiment of a plurality of collected data visualization cards being provided to a user account.

Referring now to FIGS. 1, 3a, and 3b, the method 100 proceeds to block 300 where data visualization cards are associated with users that created them. In response to the user 202 creating the data visualization card 206, the business intelligence system will associated the user account of that user 202 with the data visualization card 206 in a database. Furthermore, the user 202 may create any number of data visualization cards, using a variety of different business intelligence data, in substantially the same manner as described above for the data visualization card 206, and those data visualization cards will be associated with their user account. FIG. 3a illustrates the user 202 having created the data visualization card 206 and data visualization cards 302 and 304 using, for example, the data visualization card creation tools on the data visualization card creation screen 214, described above. Having created the plurality of data visualization cards 206, 302, and 304, the user 202 may be presented with a user account screen 306 including a data visualization card collection 308 that includes the data visualization cards 206, 302, and 304 that are associated with the user account of the user 202, as illustrated in FIG. 3b. Furthermore, each of those data visualization cards 206, 302, and 304 may be published to the business intelligence system as discussed above such that they are available to other users.

Furthermore, any user in the business intelligence system may use their user account to create data visualization cards, and those data visualization cards will then be associated with their user accounts substantially as described above. Thus, each user in the business intelligence system may be presented with a user account screen (similar to the user account screen 306 of FIG. 3b) having a data visualization card collection that allows then to view the data visualization cards that they have created, and each data visualization card may be published in the business intelligence system such that users that did not create them can view them. Thus, users in the business intelligence system are distributed business intelligence information through the data visualization cards they create, and business intelligence information may be dynamically updated as the business intelligence data, upon which their data visualization cards are based, is updated.

Referring now to FIGS. 1, 4a, and 4b, the method 100 then proceeds to block 400 where data visualization cards are associated with users in response to collect requests, and a social network is created using the data visualization cards. As discussed above, data visualization cards are published in the business intelligence system such that users that did not create those data visualization cards can view them. Users may view published data visualization cards and decide that they are interested in the business intelligence information being displayed on that data visualization card. In such a situation, the user may send a collect request to the business intelligence system that causes the business intelligence system to associate that data visualization card with the user account of the user. FIG. 4a illustrates a plurality of users 402, 404, 406, and 408 that have sent a collect request to the business intelligence system such that the data visualization cards 206 and 302 (created by the user 202) are associated with their user accounts, and a plurality of users 410, 412, and 414 that have sent a collect request to the business intelligence system such that the data visualization card 304 (created by the user 202) is associated with their user accounts.

In an embodiment, each user may be presented with a user account screen (similar to the user account screen 306 of FIG. 3b) having a data visualization card collection that allows them to view the data visualization cards that they have created and the data visualization cards they have collected. In an embodiment, user created data visualization cards may be separated or labeled different from user collected data visualization cards. Thus, users in the business intelligence system are distributed business intelligence information through the data visualization cards they create and data visualization cards they collect (but that were created by other users), and business intelligence information may be dynamically updated as the business intelligence data, upon which their data visualization cards are based, is updated.

A social network 416 is then created using the data visualization cards. The social network 416 includes a business intelligence system 418a including or having access to a database 418b, a plurality of data visualization cards 420, 422, 424, and 426, and a plurality of users 428, 430, 432, and 434. The data visualization card 420 is coupled to the business intelligence system 418a and is sent business intelligence data 420a from the business intelligence database 418 by the business intelligence system 418a. The data visualization card 422 is coupled to the business intelligence system 418a and is sent business intelligence data 422a from the business intelligence database 418 by the business intelligence system 418a. The data visualization card 424 is coupled to the business intelligence system 418a and is sent business intelligence data 424a from the business intelligence database 418 by the business intelligence system 418a. The data visualization card 426 is coupled to the business intelligence system 418a and is sent business intelligence data 426a from the business intelligence database 418 by the business intelligence system 418a.

The users 428 include user accounts that are associated with the data visualization card 420, while a user 428a of the users 428 includes a user account that is also associated with the data visualization card 426 and a user 428b of the users 428 includes a user account that is also associated with the data visualization card 422. The users 430 include user accounts that are associated with the data visualization card 422, while a user 430a of the users 430 includes a user account that is also associated with the data visualization card 424. The users 432 include user accounts that are associated with the data visualization card 424, while a user 432a of the users 432 includes a user account that is also associated with the data visualization card 426. The users 434 include user accounts that are associated with the data visualization card 426.

As discussed above, each of the users 428, 430, 432, and 434 is provided business intelligence information through the data visualization card that are associated with their user accounts. As also discussed above, the data visualization cards include business intelligence data parameters that define what business intelligence data from the database 418b is used to provide the data visualization card. The social network 416 is created by linking the users based on those users having user accounts that are associated with common data visualization cards, data visualization cards that include common business intelligence data parameters, and/or the users being provided common business intelligence data (i.e., through the data visualization cards.) For example, the users 428 may be linked together in the social network 416 through the association of their user accounts with the data visualization card 420, the users 430 and user 428b may be linked together in the social network 416 through the association of their user accounts with the data visualization card 422, the users 432 and user 430a may be linked together in the social network 416 through the association of their user accounts with the data visualization card 424, and the users 434, the user 432a, and the user 428a may be linked together in the social network 416 through the association of their user accounts with the data visualization card 426.

Figure 5A:
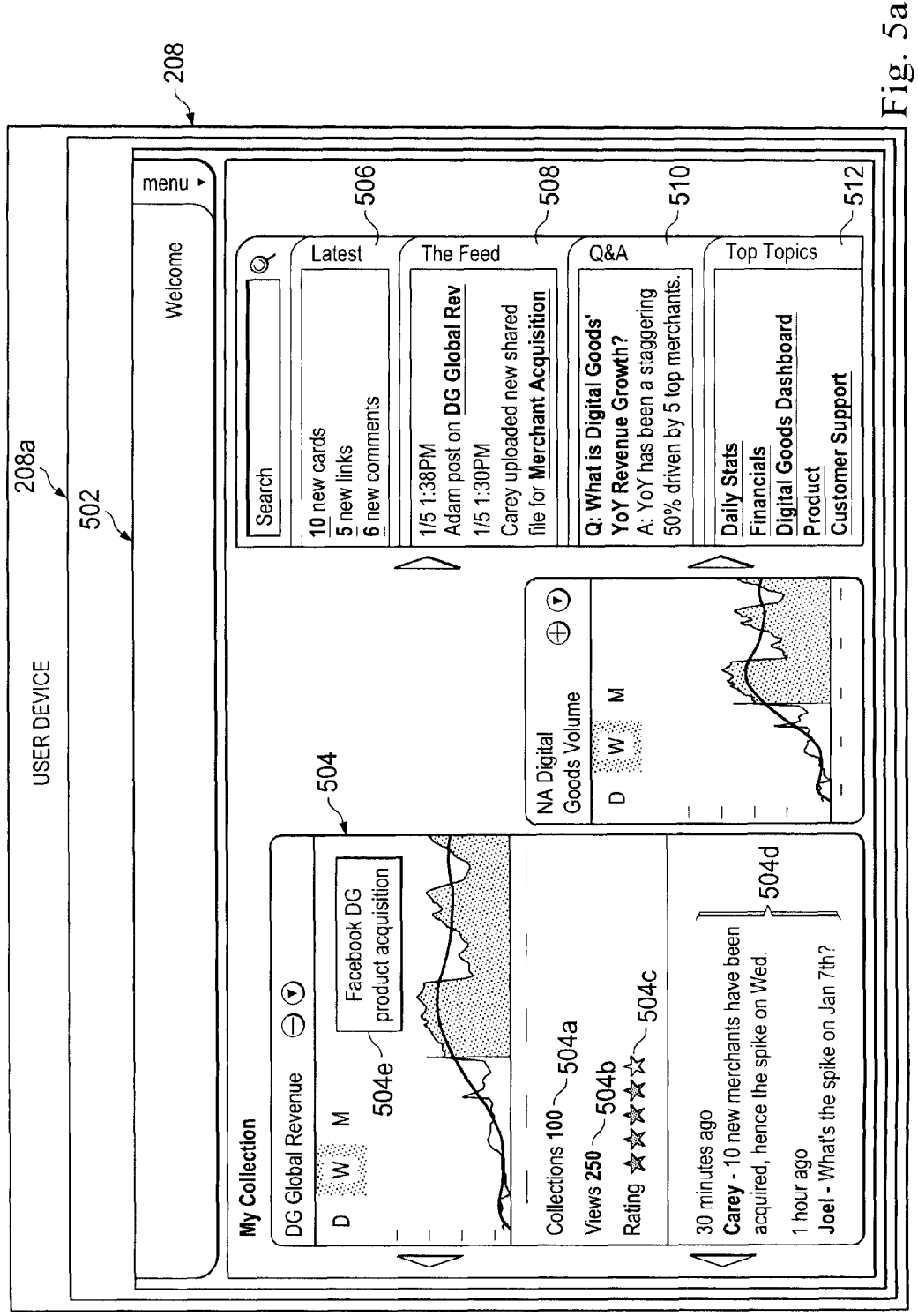
FIG. 5a is a screen shot illustrating an embodiment of user information inputs associated with a data visualization card.
Figure 5B:
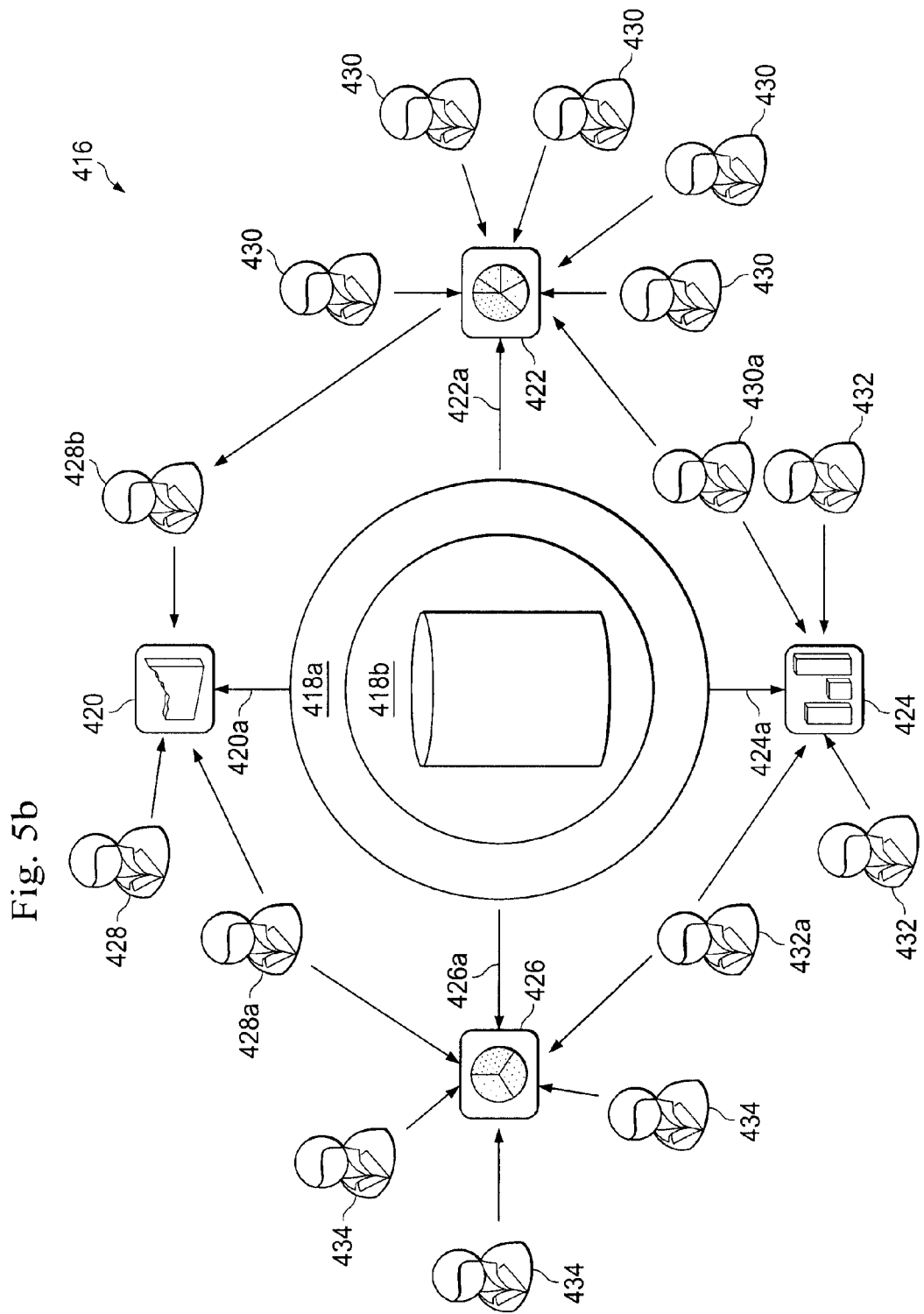
FIG. 5b is a schematic view illustrating an embodiment of a social network between the plurality of user accounts that was created using the data visualization cards.

Referring now to FIGS. 1, 5a, and 5b, the method 100 then proceeds to block 500 where user information inputs are associated with data visualization cards. In an embodiment, a user may provide a user information input for any data visualization card. In an embodiment users may provide user information inputs for data visualization cards, and those user information inputs may be associated with the user account of that user (e.g., due to the user creating that data visualization card, due to the user collecting that data visualization card, etc.). For example, in response to the selection of a data visualization card that is associated with the user account of a user, that user may be provided a user account screen 502, illustrated in FIG. 5a, that allows the user to view or provide user information inputs associated with the selected data visualization card. The user account screen 500 includes a selected data visualization card 504, a latest card information section 506, a card feed section 508, a card Question & Answer section 510, and a Top Topics section 512.

The selected data visualization card 504 includes a collections meter 504a that may indicate the number of user accounts the data visualization card 504 is associated with, a view meter 504b that may indicate the number of times the data visualization card 504 has been viewed, a rating meter 504c that may indicate the collective rating of the usefulness of the data visualization card 504 by the users, a comments section 504d that may include a plurality of comments on the data visualization card 504 by the users, and an annotation 504e that may include a selection of one or more data points on the data visualization card and a comment associated with that data point. User information inputs that may be provided by users include the users collecting the data visualization card 504 such that the collections meter 504a is modified, the users viewing the data visualization card 504 such that the view meter 504b is modified, the users rating the data visualization card 504 such that the rating meter 504c is modified, the users adding a comment to the comment section 504d, the users adding an annotation (e.g., the annotation 504e) to the data visualization card 504, and/or a variety of other user information inputs know in the art. Any user information inputs provided for a data visualization card may be associated with that data visualization card and/or the user account of the user that provided that user information input. Furthermore, user information inputs associated with data visualization cards will then be distributed to any users who have user accounts associated with those data visualization cards (e.g., by including the user information inputs in the data visualization card provided to the user accounts.)

In an embodiment, the user information inputs for a given data visualization card may be provided in a variety of ways to users who have user accounts associated with that data visualization card. For example, the latest card information section 506 may be provided by retrieving any current user information inputs (e.g., user information inputs associated with the data visualization card within a threshold time) and categorizing those current user information inputs. In the illustrated embodiment, the latest card information section 506 includes an indication that there are 10 new data visualization cards being suggested to the user (discussed in further detail below), 5 new links (e.g., users may provide user information inputs that include links to information about the business intelligence data being displayed in the data visualization card) associated with the users collected data visualization cards, and 6 new comments associated with the users collected data visualization cards. In another example, the card feed section 508 may be provided by retrieving user information inputs for the users collected data visualization cards. In the illustrated embodiment, the card feed section 508 includes a list of comments posted by other users on the users collected data visualization cards. In another example, the card Question & Answer section 510 may be provided by retrieving user information inputs for the users collected data visualization cards. In the illustrated embodiment, the card Question & Answer section 510 includes questions posted by other users on the users collected data visualization cards. In an embodiment, the Top Topics section 512 may provide topics selected in response to the business intelligence system determining that they include information in common with the users collected data visualization cards.

FIG. 5b illustrates the social network 416 with the plurality of users 428 providing user information inputs to the data visualization card 420, the users 430 and user 428b providing user information inputs to the data visualization card 422, the users 432 and user 430a providing user information inputs to the data visualization card 424, and the users 434, the user 432a, and the user 428a providing user information inputs to the data visualization card 426. Thus, business intelligence information that includes user provided information inputs about displayed business intelligence data is distributed to a plurality of users.

Furthermore the business intelligence system may use the social network to discover user information inputs created by users such as, for example, user commentaries, documents uploaded to the business intelligence system by the users, links to wiki web pages, forum discussions, blogs, etc. The business intelligence system may then provide the discovered user information inputs to other users based on the links in the social network. Through collective action by the users with the data visualization cards (e.g., providing user information inputs), a value is created and defined for the business intelligence information available to the business intelligence system. The continued creation, collection, and input to data visualization cards increases the value of those cards in the business intelligence system.

Figure 6B:
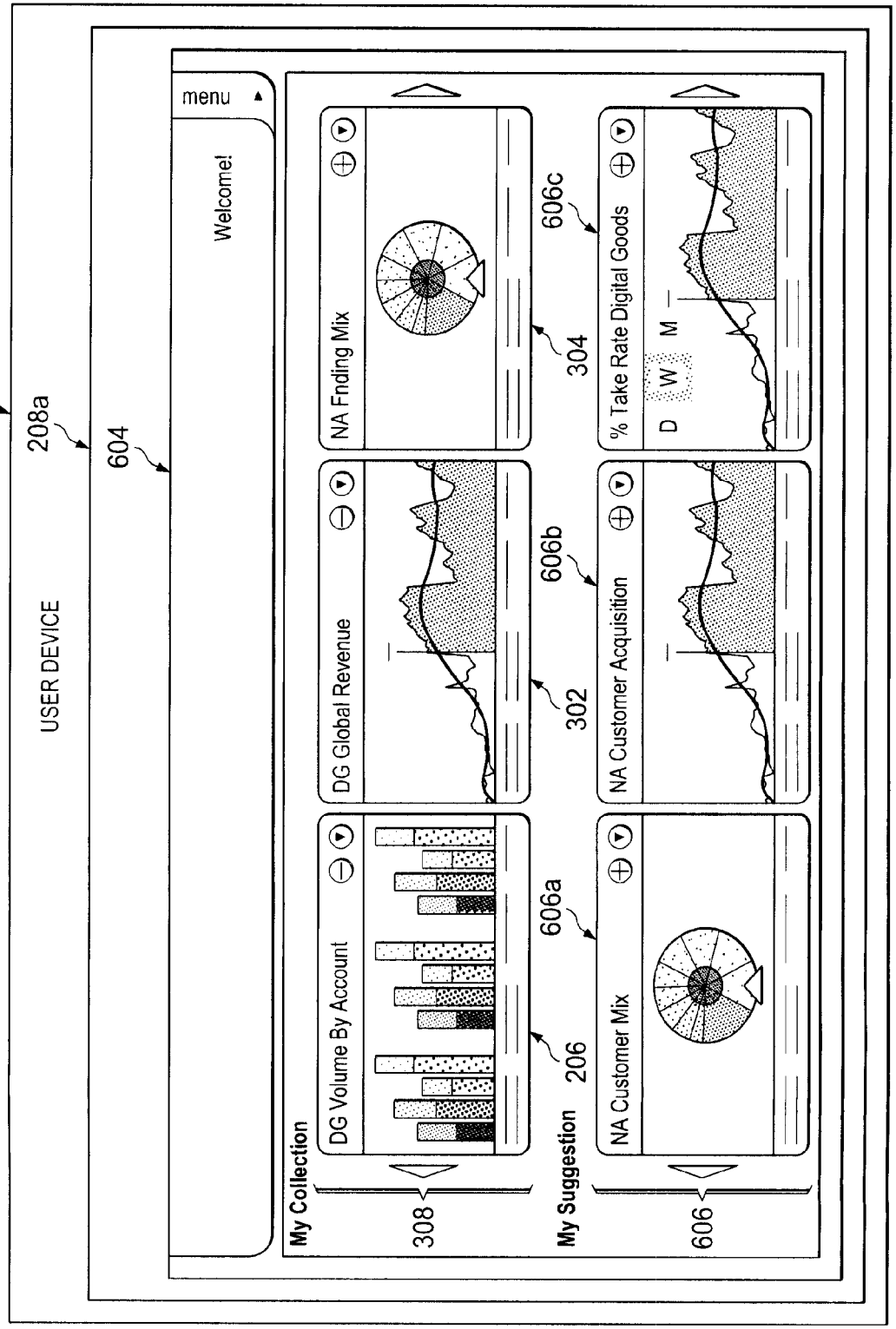
FIG. 6b is a screen shot illustrating an embodiment of a plurality of data visualization cards being suggested or provided to a user account based on the social network of FIG. 5b.

Referring now to FIGS. 1, 6a, and 6b, the method 100 proceeds to block 600 where data visualization cards are suggested to users based on social network links. In one embodiment, the business intelligence system provides or suggests a first data visualization card (created or collected by a one or more first users having first user accounts) to a second user account of a second user due to the association of the second user account with at least one of the first user accounts based on the association of the at least one of the first user accounts and the second user account with data visualization cards that include common business intelligence data parameters or that use common business intelligence data. FIG. 6a illustrates a user 602 that has a user account associated with data visualization cards 302 and 304. The user account of the user 602 is being provided or suggested the data visualization card 206 based on the user account of the user 602 being associated with the data visualization card 302 along with the user accounts of the users 402, 404, 406, and 408 being associated with the data visualization card 302 and the data visualization card 206. In other words, because a common data visualization card (the data visualization card 302) was associated with both the users accounts of users 402, 404, 406, and 408 and the user 602, the data visualization card 206 is provided or suggested to the user 602 due to the user account of the user being associated with the user accounts of the users 402, 404, 406, and 408 through the data visualization cards.

FIG. 6b illustrates a user account screen 604 having the data visualization card collection 308, discussed above, that includes the data visualization cards 206, 302, and 304 that are associated with the user account of the user 202. The user account screen 604 also includes a data visualization card suggestions 606 having a plurality of suggested data visualization cards 606a, 606b, and 606c. The suggested data visualization cards 606a, 606b, and 606c are provided based on the social network links as discussed above, and the user may select any of the suggested data visualization cards 606a, 606b, and 606c in order to collect those data visualization cards and have them added to the users data visualization collection 308, e.g., by "dragging and dropping" a data visualization card from the data visualization card suggestions 606 to the data visualization card collection 608.

In an embodiment, users may share data visualization cards with other users. For example, a first user may choose to share a data visualization card with a second user, and that data visualization card may then be provided to the second users in the data visualization card suggestions 606 of the user account of the second user. The second user may then collect that shared data visualization card.

Thus, a system and method have been described that distributes business intelligence information to a plurality of users through the use of data visualization cards that may be created and collected by users. A social network is created based on the business intelligence information created and collected by the users, and used to suggest other business intelligence information that may be of interest to the users. Users may provide user information inputs to the data visualization cards and have those user information inputs distributed to the users that are collecting those data visualization cards in order to supplement the business intelligence information that is provided using business intelligence data generated during business operation with business intelligence information provided by the users themselves.

Figure 7:
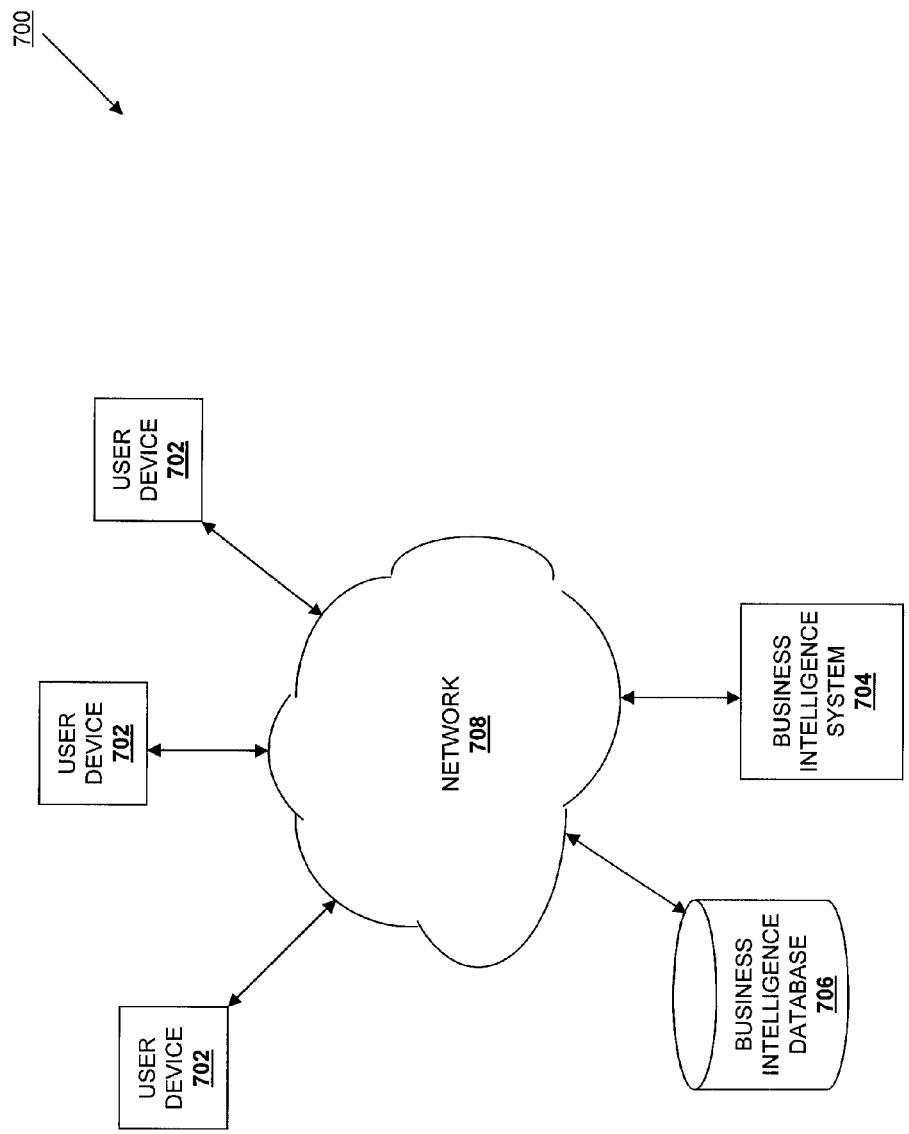
FIG. 7 is a schematic view illustrating an embodiment of a networked system.

Referring now to FIG. 7, an embodiment of a networked system 700 used in the system described above is illustrated. The networked system 700 includes a plurality of user devices 702, a business intelligence system 704, and a business intelligence database 706 in communication over a network 708. Any of the user devices 702 may be the user device 208, discussed above. The business intelligence system 304 may be operated by a payment service provider such as, for example, PayPal Inc. of San Jose, Calif. The business intelligence database 706 may include a variety of business intelligence data generated by a business. While the business intelligence database 706 is illustrated as connected to the business intelligence system 704 through the network, the business intelligence database 706 may be part of the business intelligence system without departing from the scope of the present disclosure.

The user devices 702 and business intelligence system 704 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 708.

The network 708 may be implemented as a single network or a combination of multiple networks. For example, in various embodiments, the network 708 may include the Internet and/or one or more intranets, landline networks, wireless networks, and/or other appropriate types of networks.

The user devices 702 may be implemented using any appropriate combination of hardware and/or software configured for wired and/or wireless communication over network 708. For example, in one embodiment, a user device 702 may be implemented as a personal computer of a user in communication with the Internet. In other embodiments, the user device 702 may be a smart phone, personal digital assistant (PDA), laptop computer, and/or other types of computing devices.

The user device 702 may include one or more browser applications which may be used, for example, to provide a convenient interface to permit the user to browse information available over the network 708. For example, in one embodiment, the browser application may be implemented as a web browser configured to view information available over the Internet.

The user device 702 may also include one or more toolbar applications which may be used, for example, to provide user-side processing for performing desired tasks in response to operations selected by the user. In one embodiment, the toolbar application may display a user interface in connection with the browser application.

The user device 702 may further include other applications as may be desired in particular embodiments to provide desired features to the user device 702. The other applications may also include security applications for implementing user-side security features, programmatic user applications for interfacing with appropriate application programming interfaces (APIs) over the network 708, or other types of applications. Email and/or text applications may also be included, which allow the user to send and receive emails and/or text messages through the network 708. The user device 702 includes one or more user and/or device identifiers which may be implemented, for example, as operating system registry entries, cookies associated with the browser application, identifiers associated with hardware of the user device 702, or other appropriate identifiers, such as a phone number. In one embodiment, the user identifier may be used by the business intelligence system 704 to associate the user with a particular account as further described herein.

Figure 8:
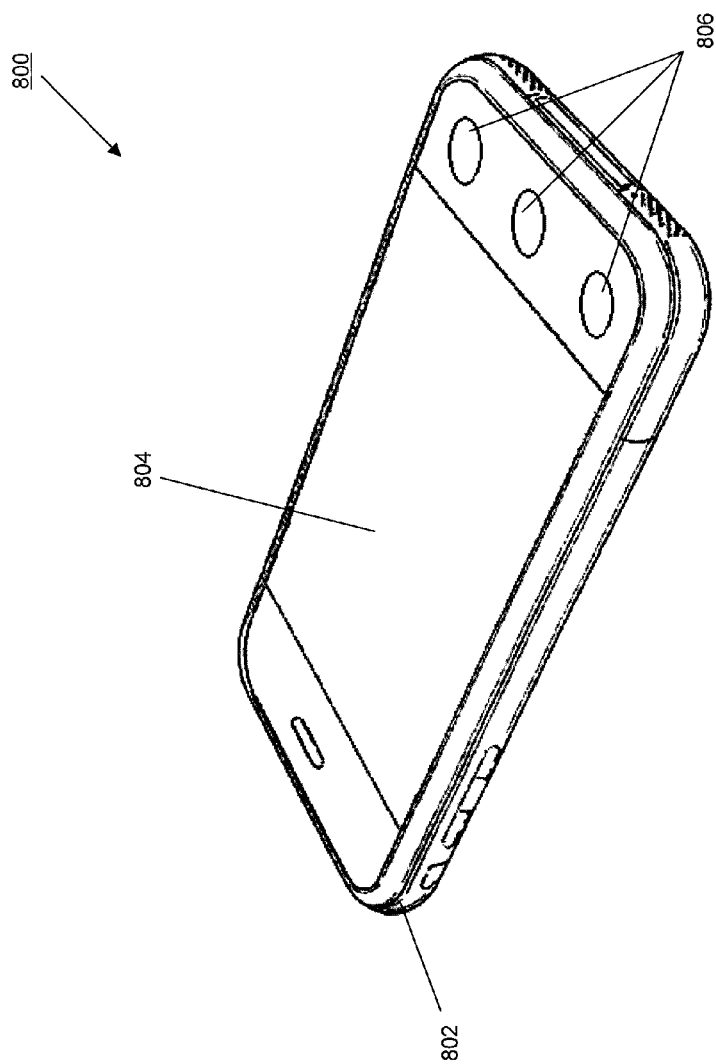
FIG. 8 is a perspective view illustrating an embodiment of a user device.

Referring now to FIG. 8, an embodiment of a user device 800 is illustrated. The user device 800 may be the user devices 208 and/or 702. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 9:
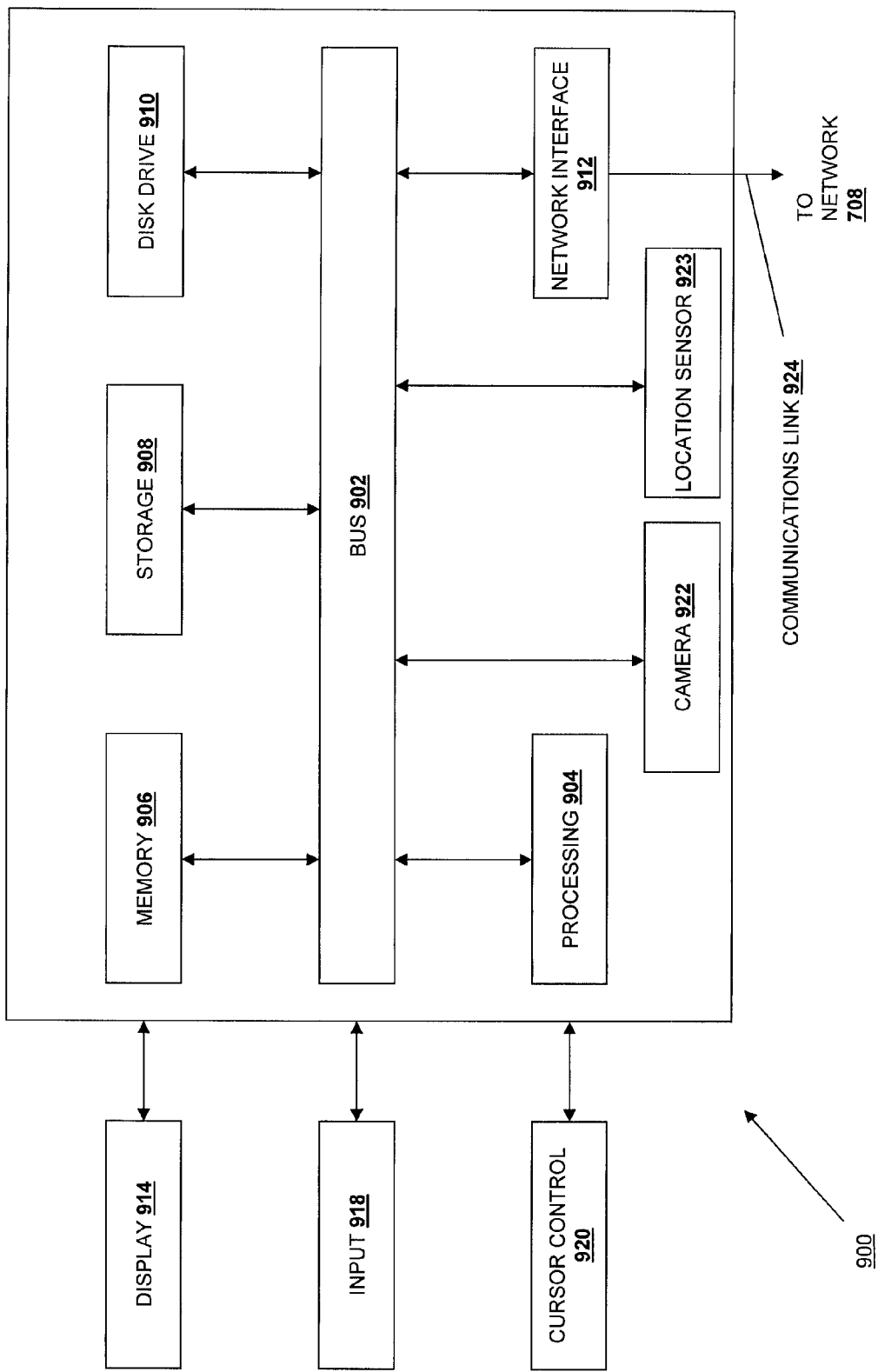
FIG. 9 is a schematic view illustrating an embodiment of a computer system.

Referring now to FIG. 9, an embodiment of a computer system 900 suitable for implementing, for example, the user device 208, the user device 702, the user device 800, and/or the business intelligence system 704, is illustrated. It should be appreciated that other devices utilized by user and/or the business intelligence system, in the system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a camera component 922, and/or a location sensor component 923 (e.g., a Global Positioning System (GPS) device, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user device 208, 702, and 800, and/or the business intelligence system 704. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 708 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
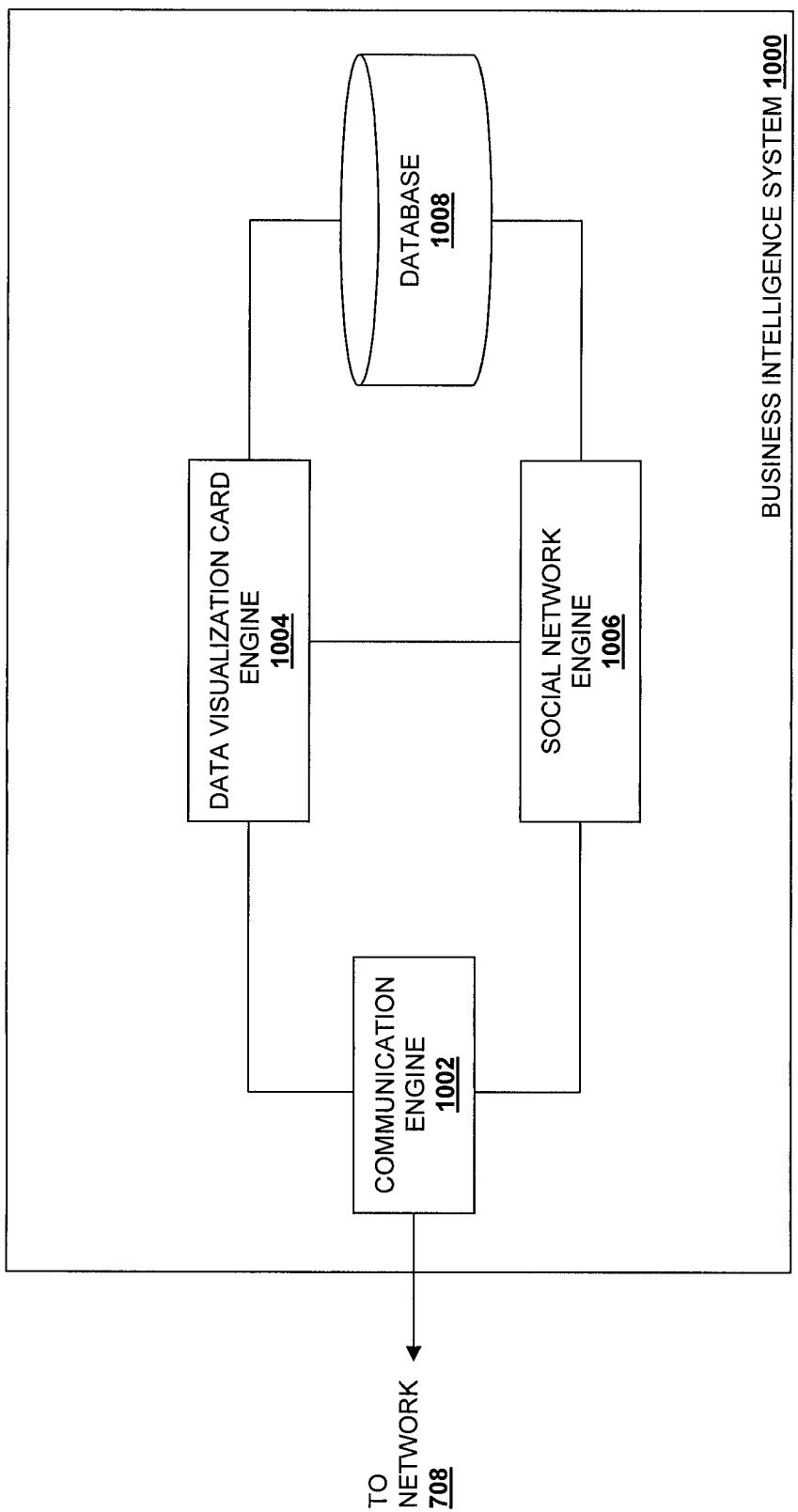
FIG. 10 is a schematic view illustrating an embodiment of a business intelligence system.

Referring now to FIGS. 10, an embodiment of a business intelligence system 1000 is illustrated. In an embodiment, the business intelligence system 1000 may be the business intelligence system 704, discussed above. The business intelligence system 1000 includes a communication engine 1002 that is coupled to the network 708 and to each of a user data visualization card engine 1004 and a social network engine 1006. The data visualization card engine 1004 and the social network engine 1006 are coupled to each other and to one or more databases 1008. The communication engine 1002 may be software or instructions stored on a computer-readable medium that, when executed by a processor, allows the business intelligence system 1000 to send and receive information over the network 708. The data visualization card engine 1004 may be software or instructions stored on a computer-readable medium that, when executed by the processor, allow the business intelligence system 1000 to create data visualization cards, associate data visualization cards with user accounts in the one or more databases 1008, and/or provide a variety of the other data visualization card functionality discussed above. The social network engine 1006 may be software or instructions stored on a computer-readable medium that, when executed by the processor, allow the business intelligence system 1000 create the social network based on the data visualization cards, suggest data visualization cards to users based on the social network links, and/or provide a variety of the other social network functionality discussed above. While the one or more databases 1008 have been illustrated as located in the business intelligence system 1000, one of skill in the art will recognize that it may include they business intelligence database 706 connected to the data visualization card engine 1004 and the social network engine 1006 through the network 708 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have included payment service providers generating business intelligence information; however, business intelligence information may be generated by a variety of other businesses. Thus, a variety of other businesses that generate business intelligence information are meant to fall within the scope of the present disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for distributing business intelligence information, comprising:

creating, by a service provider system, a plurality of data visualization cards that each include business intelligence data parameters and data visualization parameters, wherein each of the plurality of data visualization cards is created by the service provider system in response to a respective create request received from at least one of a plurality of user accounts, and wherein each of the plurality of data visualization cards is associated with instructions to 1) retrieve business intelligence data from a business intelligence database according to the business intelligence data parameters for that data visualization card and 2) transform the retrieved business intelligence data using the data visualization parameters for that data visualization card such that each data visualization card is configured to be displayed as a separate virtual object that provides the graphical representation of the retrieved business intelligence data for that data visualization card;

associating, by the service provider system in a card database, each data visualization card with the user account that requested the creation of that data visualization card;

associating, by the service provider system in the card database, data visualization cards with user accounts, which did not request the creation of those data visualization cards, in response to a collect request received from those user accounts;

creating, by the service provider system, a social network amongst the plurality of user accounts using the data visualization cards such that user accounts associated with data visualization cards created from common business intelligence data are linked in the social network; and transmitting, by the service provider system, a first data visualization card that is associated with instructions to 1) retrieve business intelligence data from a business intelligence database according to first business intelligence data parameters for the first data visualization card and 2) transform the retrieved first business intelligence data into a graphical representation of the retrieved first business intelligence data using first data visualization parameters for the first data visualization card such that the first data visualization card is configured to be displayed as a separate virtual object that provides the graphical representation of the retrieved first business intelligence data, which was created by the service provider system in response to a create request received from a first user account, to a second user account in response to determining that the first user account and the second user account are linked in the social network due to their association with data visualization cards created from common business intelligence data.

2. The method of claim 1, wherein the business intelligence data parameters for each of the plurality of data visualization cards are associated with business intelligence data that includes business sales data.

3. The method of claim 1, further comprising:
publishing, by the service provider system, each data visualization card such that user accounts that did not request the creation of that data visualization card have access to the display of that data visualization card.

4. The method of claim 1, further comprising:
receiving, by the service provider system, a user information input for the first data visualization card from one of the plurality of user accounts; and
associating, by the service provider system, the user information input with the instructions for the first data visualization card in the card database such that the first data visualization card is configured to be displayed as a separate virtual object that provides the graphical representation of the retrieved first business intelligence data along with the user information input.

5. The method of claim 4, further comprising:
providing, by the service provider system, the first data visualization card including the associated user information input for display to at least one user account that is associated with the first data visualization card and did not request the creation of the first data visualization card.

6. The method of claim 4, wherein the user information input includes one of a comment, a question, an annotation, a tag, and a rating.

7. The method of claim 4, further comprising:
transmitting, by the service provider system, the user information input to the second user account in response to determining that the first user account and the second user account are linked in the social network due to their association with data visualization cards created from common business intelligence data.

8. The method of claim 1, further comprising:
determining, by the service provider system, that a plurality of data visualization cards associated with the second user account have each been associated with at least one user information input; and
providing, by the service provider system, the second user account with an indication that the plurality of data visualization cards associated with the second user account have each been associated with at least one user information input.

9. A non-transitory machine-readable medium comprising a plurality of machine-readable instructions which, when executed by one or more processors, are adapted to cause the one or more processors to perform a method comprising:
creating a plurality of data visualization cards that each include business intelligence data parameters and data visualization parameters, wherein each of the plurality of data visualization cards is created in response to a respective create request received from at least one of a plurality of user accounts, and wherein each of the plurality of data visualization cards is associated with instructions to 1) retrieve business intelligence data from a business intelligence database according to the business intelligence data parameters for that data visualization card and 2) transform the retrieved business intelligence data using the data visualization parameters for that data visualization card such that each data visualization card is configured to be displayed as a separate virtual object that provides the graphical representation of the retrieved business intelligence data for that data visualization card;
associating, in a card database, each data visualization card with the user account that requested the creation of that data visualization card;
associating, in the card database, data visualization cards with user accounts, which did not request the creation of those data visualization cards, in response to a collect request received from those user accounts;
creating a social network amongst the plurality of user accounts using the data visualization cards such that user accounts associated with data visualization cards created from common business intelligence data are linked in the social network; and
transmitting a first data visualization card that is associated with instructions to 1) retrieve business intelligence data from a business intelligence database according to first business intelligence data parameters for the first data visualization card and 2) transform the retrieved first business intelligence data into a graphical representation of the retrieved first business intelligence data using first data visualization parameters for the first data visualization card such that the first data visualization card is configured to be displayed as a separate virtual object that provides the graphical representation of the retrieved first business intelligence data, which was created by the service provider system in response to a create request received from a first user account, to a second user account in response to determining that the first user account and the second user account are linked in the social network due to their association with data visualization cards created from common business intelligence data.

10. The non-transitory machine-readable medium of claim 9, wherein the business intelligence data parameters for each of the plurality of data visualization cards are associated with business intelligence data that includes business sales data.

11. The non-transitory machine-readable medium of claim 9, wherein the method further comprises:
publishing each data visualization card such that user accounts that did not request the creation of that data visualization card have access to the display of that data visualization card.

12. The non-transitory machine-readable medium of claim 9, wherein the method further comprises:
receiving a user information input for the first data visualization card from one of the plurality of user accounts; and
associating the user information input with the instructions for the first data visualization card in the card database such that the first data visualization card is configured to be displayed as a separate virtual object that provides the graphical representation of the retrieved first business intelligence data along with the user information input.

13. The non-transitory machine-readable medium of claim 9, wherein the method further comprises:
providing the first data visualization card including the associated user information input for display to at least one user account that is associated with the first data visualization card and did not request the creation of the first data visualization card.

14. The non-transitory machine-readable medium of claim 13, wherein the method further comprises:
publishing the first data visualization card including the associated user information input for display to at least one user account associated with the first data visualization card.

15. The non-transitory machine-readable medium of claim 13, wherein the user information input includes one of a comment, a question, an annotation, a tag, and a rating.

16. The non-transitory machine-readable medium of claim 9, wherein the method further comprises:
transmitting, the user information input to the second user account in response to determining that the first user account and the second user account are linked in the social network due to their association with data visualization cards created from common business intelligence data.

17. A business intelligence based social network system, comprising:
means for creating a plurality of data visualization cards that each include business intelligence data parameters and data visualization parameters, wherein each of the plurality of data visualization cards is created in response to a respective create request received from at least one of a plurality of user accounts, and wherein each of the plurality of data visualization cards is associated with instructions to 1) retrieve business intelligence data from a business intelligence database according to the business intelligence data parameters for that data visualization card and 2) transform the retrieved business intelligence data using the data visualization parameters for that data visualization card such that each data visualization card is configured to be displayed as a separate virtual object that provides the graphical representation of the retrieved business intelligence data for that data visualization card;
means for associating, in a card database, each data visualization card with the user account that requested the creation of that data visualization card;
means for associating, in the card database, data visualization cards with user accounts, which did not request the creation of those data visualization cards, in response to a collect request received from those user accounts;
means for creating a social network amongst the plurality of user accounts using the data visualization cards such that user accounts associated with data visualization cards created from common business intelligence data are linked in the social network; and
means for transmitting a first data visualization card that is associated with instructions to 1) retrieve business intelligence data from a business intelligence database according to first business intelligence data parameters for the first data visualization card and 2) transform the retrieved first business intelligence data into a graphical representation of the retrieved first business intelligence data using first data visualization parameters for the first data visualization card such that the first data visualization card is configured to be displayed as a separate virtual object that provides the graphical representation of the retrieved first business intelligence data, which was created by the service provider system in response to a create request received from a first user account, to a second user account in response to determining that the first user account and the second user account are linked in the social network due to their association with data visualization cards created from common business intelligence data.

18. The system of claim 17, further comprising:
means for publishing each data visualization card such that user accounts that did not request the creation of that data visualization card have access to the display of that data visualization card.

19. The system of claim 17, further comprising:
means for receiving a user information input for the first data visualization card from one of the plurality of user accounts; and
means for associating the user information input with the instructions for the first data visualization card in the card database such that the first data visualization card is configured to be displayed as a separate virtual object that provides the graphical representation of the retrieved first business intelligence data along with the user information input.

20. The system of claim 19, further comprising:
means for transmitting the user information input to the second user account in response to determining that the first user account and the second user account are linked in the social network due to their association with data visualization cards created from common business intelligence data.

* * * * *